United States Patent
Bhorkar et al.

(10) Patent No.: US 11,064,521 B2
(45) Date of Patent: Jul. 13, 2021

(54) SCHEDULING UPLINK TRANSMISSIONS FOR A USER EQUIPMENT (UE)

(71) Applicant: APPLE INC., Cupertino, CA (US)

(72) Inventors: Abhijeet Bhorkar, Fremont, CA (US); Hwan-Joon Kwon, Santa Clara, CA (US); Jeongho Jeon, San Jose, CA (US); Qiaoyang Ye, Fremont, CA (US)

(73) Assignee: APPLE INC., Cupertino, CA (US)

( * ) Notice: Subject to any disclaimer, the term of this patent is extended or adjusted under 35 U.S.C. 154(b) by 387 days.

(21) Appl. No.: 15/761,397

(22) PCT Filed: Oct. 17, 2016

(86) PCT No.: PCT/US2016/057391
§ 371 (c)(1),
(2) Date: Mar. 19, 2018

(87) PCT Pub. No.: WO2017/070055
PCT Pub. Date: Apr. 27, 2017

(65) Prior Publication Data
US 2018/0270860 A1    Sep. 20, 2018

Related U.S. Application Data

(60) Provisional application No. 62/292,106, filed on Feb. 5, 2016, provisional application No. 62/243,560, filed on Oct. 19, 2015.

(51) Int. Cl.
*H04W 74/08* (2009.01)
*H04W 72/04* (2009.01)
(Continued)

(52) U.S. Cl.
CPC ... *H04W 74/0808* (2013.01); *H04W 72/0406* (2013.01); *H04W 72/14* (2013.01); *H04W 74/006* (2013.01); *H04W 16/14* (2013.01)

(58) Field of Classification Search
CPC ......... H04W 74/0808; H04W 72/0406; H04W 74/006; H04W 72/14
See application file for complete search history.

(56) References Cited

U.S. PATENT DOCUMENTS

2016/0227545 A1* 8/2016 Yang ................. H04W 72/0406
2016/0262188 A1* 9/2016 Zhang .................. H04J 11/0056
(Continued)

OTHER PUBLICATIONS

3GPP TSG RAN WG1 Meeting #82bis (R1-155312); UL LBT for self-carrier scheduling; Intel Corporation; Agenda Item: 7.2.3.1; Malmo, Sweden; Oct. 5-9, 2015.
(Continued)

*Primary Examiner* — Charles C Jiang
*Assistant Examiner* — Voster Preval
(74) *Attorney, Agent, or Firm* — Stoel Rives LLP

(57) ABSTRACT transmissions outside a transmission opportunity (TxOP) is disclosed. The UE can process an uplink (UL) opportunity received from an eNodeB during a defined transmission opportunity (TxOP). The UL opportunity can schedule UL information to be transmitted from the UE on one or more UL subframes that are outside the defined TxOP. The UE can initiate a listen-before-talk (LBT) procedure to be performed before the UL information is transmitted from the UE on the one or more UL subframes that are outside the defined TxOP. The UE can process the UL information for transmission to the eNodeB on the one or more UL subframes located outside the defined TxOP.

10 Claims, 14 Drawing Sheets

(51) Int. Cl.
  *H04W 72/14*   (2009.01)
  *H04W 74/00*   (2009.01)
  *H04W 16/14*   (2009.01)

(56) References Cited

U.S. PATENT DOCUMENTS

| | | | | |
|---|---|---|---|---|
| 2016/0337935 | A1* | 11/2016 | Patil | H04W 76/14 |
| 2017/0019909 | A1* | 1/2017 | Si | H04L 47/27 |
| 2017/0048880 | A1* | 2/2017 | Anderson | H04W 72/1226 |
| 2017/0048889 | A1* | 2/2017 | Kadous | H04W 72/0446 |
| 2017/0093545 | A1* | 3/2017 | Kadous | H04L 5/0055 |
| 2017/0257775 | A1* | 9/2017 | Jiang | H04W 72/042 |
| 2018/0139599 | A1* | 5/2018 | Yasukawa | H04W 8/005 |
| 2018/0146494 | A1* | 5/2018 | Khoryaev | H04W 76/15 |
| 2018/0206140 | A1* | 7/2018 | Panteleev | H04W 72/044 |
| 2018/0212733 | A1* | 7/2018 | Khoryaev | H04L 5/0051 |
| 2018/0213500 | A1* | 7/2018 | Li | H04J 3/0638 |
| 2018/0227973 | A1* | 8/2018 | Tsuboi | H04W 48/12 |
| 2018/0279258 | A1* | 9/2018 | Yasukawa | H04L 5/0053 |
| 2018/0279366 | A1* | 9/2018 | Harada | H04W 72/0446 |
| 2018/0302795 | A1* | 10/2018 | Harada | H04W 16/14 |
| 2019/0014596 | A1* | 1/2019 | Yang | H04W 72/0446 |
| 2020/0228991 | A1* | 7/2020 | Jiang | H04W 72/042 |

OTHER PUBLICATIONS

3GPP TSG RAN WG1 Meeting #82bis (R1-155155); Evaluation of some sensing options for UL LBT; Fujitsu; Agenda Item: 7.2.3.1; Malmo, Sweden; Oct. 5-9, 2015.

3GPP TSG RAN WG1 Meeting #82bis (R1-155245); UL framework for LAA; ZTE; Agenda Item: 7.2.3.1; Malmo, Sweden; Oct. 5-9, 2015.

3GPP TSG RAN WG1 Meeting #81 (R1-153001); Discussion on the UL LBT for LAA; ETRI; Agenda Item: 6.2.4.3; Fukuoka, Japan; May 25-29, 2015.

* cited by examiner

SCHEDULING UPLINK TRANSMISSIONS FOR A USER EQUIPMENT (UE)

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE) Release 8, 9, 10, 11, 12 and 13, the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
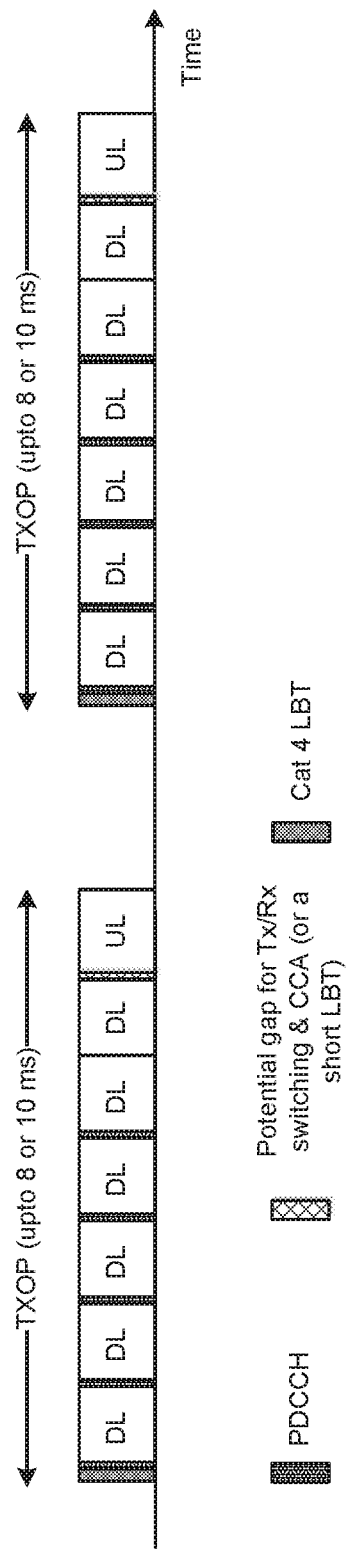
FIG. 1 illustrates downlink and uplink transmissions between an eNodeB and a user equipment (UE) within a transmission opportunity (TxOP) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Scheduling UL Transmissions Outside a TxOP

The explosive growth in wireless traffic has led to a demand for rate improvement. However, with mature physical layer techniques, further improvement in spectral efficiency has been marginal. In addition, the scarcity of licensed spectrum in the low frequency band results in a deficit in the data rate boost. There are emerging interests in the operation of LTE systems in unlicensed spectrum. In 3GPP LTE Release 13, one enhancement has been to enable operation in the unlicensed spectrum via licensed-assisted access (LAA). LAA can expand the system bandwidth by utilizing a flexible carrier aggregation (CA) framework, as introduced in the LTE-Advanced system (3GPP LTE Release 10 system). Release 13 LAA focuses on the downlink (DL) design, while Release14 enhanced LAA (or eLAA) focuses on the uplink (UL) design. Further enhanced operation of LTE systems in the unlicensed spectrum is expected in upcoming LTE evolutions. In one example, LTE operation in the unlicensed spectrum can be achieved using dual connectivity (DC) based LAA. In another example, LTE operation in the unlicensed system can be achieved using a MuLTEfire system, which does not utilize an anchor in the licensed spectrum. The MuLTEfire system is a stand-alone LTE system that operates in the unlicensed spectrum. Therefore, Release 14 eLAA and MuLTEfire systems can potentially be significant evolutions in future wireless networks.

In the present technology, an eNodeB can enable a UE to perform uplink transmissions outside of a transmission opportunity (TxOP). More specifically, the UE can perform uplink transmissions outside of the eNodeB's TxOP. The TxOP can refer to a certain duration of time that an initiating node (UE or eNodeB) obtains ownership of channel time, during which the initiating node and responding nodes can perform a transmission. The UL transmissions performed by the UE outside the TxOP can include physical uplink shared channel (PUSCH) transmissions and/or physical uplink control channel (PUCCH) transmissions, e.g., enhanced physical uplink control channel (ePUCCH) in MuLTEfire system. In addition, the initiating node can grab the channel by performing a listen-before-talk (LBT) procedure, and then obtaining a certain TxOP duration (referred to as an obtained channel occupancy time). In the present technology, an existing LBT procedure can be modified, such that the UE can perform UL transmissions outside of the eNodeB's TxOP. While the UL transmission is performed outside of the eNodeB's TxOP, the UL transmission may be within the UE's TxOP if the UE performed LBT to acquire the channel occupancy.

In LTE Release 13 LAA, a DL burst transmission can be preceded by an LBT (e.g., Category 4 LBT) or clear channel assessment (CCA) performed at the eNodeB, which can include an initial defer duration sensing and a sensing procedure involving an exponential random backoff procedure. The LTE Release 13 LAA transmission duration is restricted by a maximum channel occupancy time (MCOT) or transmission opportunity (TXOP) after the completion of LBT. For example, the MCOT or TxOP can be limited to 8 milliseconds (ms) (if LAA co-exists with WiFi) or 10 ms (otherwise) if priority 3 LBT parameters are used. In contrast to Release 13 LAA which only supports downlink transmission, for Release 14 eLAA or the MuLTEfire system, the MCOT can be used for both DL subframe(s) from the eNodeB and UL transmission(s) from UEs associated with the corresponding eNodeB.

FIG. 1 illustrates an example of downlink and uplink transmissions between an eNodeB and a user equipment (UE) within a transmission opportunity (TxOP). As an example, the TxOP can span a time period of 8 to 10 ms. The TxOP can include one or more DL subframes and one or more UL subframes. The eNodeB can perform a listen before talk (LBT) procedure, such as Category 4 LBT, at a start of the TxOP. One or more subframes can include a physical downlink control channel (PDCCH). In addition, between a last DL subframe within the TxOP and a first UP subframe within the TxOP, there can be a potential gap for transmit/receive (Tx/Rx) switching and a single interval clear channel assessment (CCA) (or a short LBT).

In one example, LAA or standalone MuLTEfire systems can involve the transmission of UL subframes consisting or PUSCH and/or PUCCH. For example, in MuLTEfire operation, uplink control information (UCI) can be transmitted on an unlicensed carrier and can be subject to LBT. A legacy PUCCH design spans 13-14 symbols and the transmission can be aligned to a PCell subframe boundary. Due to asymmetry between DL and UL traffic volume, there can be occasions where only the PUCCH is transmitted without the PUSCH. In MuLTEfire, a short PUCCH (sPUCCH) spanning 1-4 symbols can be transmitted within a TXOP for hybrid automatic repeat request (HARQ) acknowledgement (ACK) feedback. However, due to a UE processing latency limitation, HARQ/ACK feedback corresponding to certain DL subframes within the TXOP may be unable to be transmitted on the sPUCCH within the TXOP. Therefore, in MuLTEfire, an ePUCCH can span 12-14 symbols carrying the HARQ/ACK bits, and the ePUCCH can be transmitted outside of the TXOP.

Figure 2:
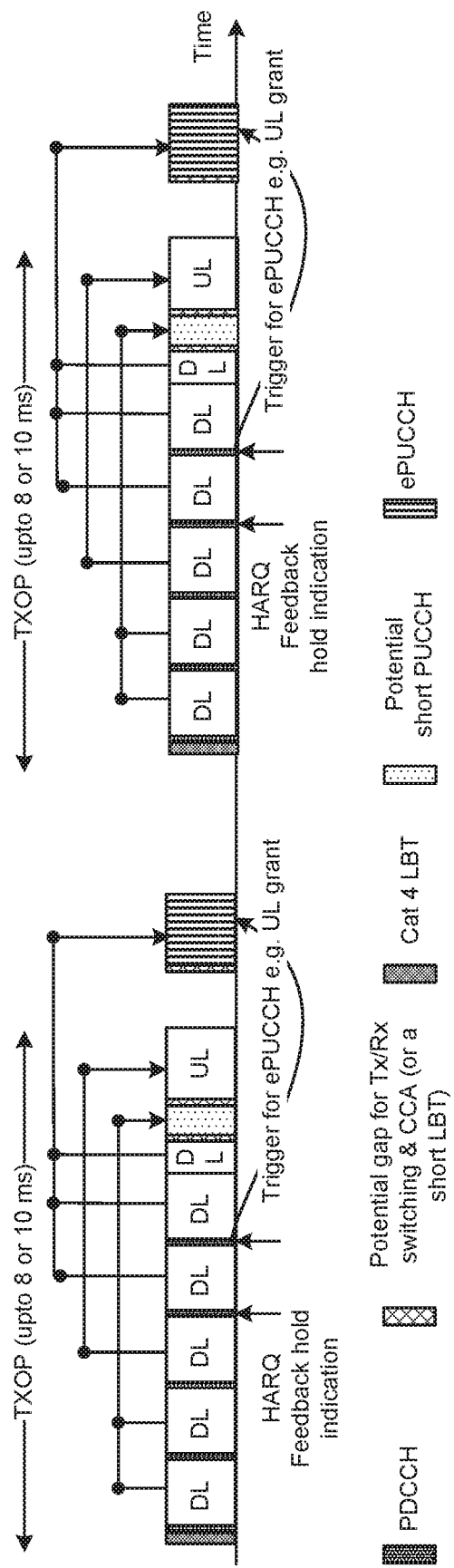
FIG. 2 illustrates an enhanced physical uplink control channel (ePUCCH) transmission from a user equipment (UE) outside a transmission opportunity (TxOP) in accordance with an example.

FIG. 2 illustrates an example of an enhanced physical uplink control channel (ePUCCH) transmission from a user equipment (UE) outside a transmission opportunity (TxOP). As an example, the TxOP can span a time period of 8 to 10 ms. The TxOP can include one or more DL subframes and one or more UL subframes, as well as a short PUCCH (sPUCCH) between a last DL subframe within the TxOP and a first UL subframe within the TxOP. The sPUCCH can be enclosed by potential gaps for transmit/receive (Tx/Rx) switching and a clear channel assessment (CCA) (or a short LBT). The eNodeB can perform a listen before talk (LBT) procedure, such as Category 4 LBT, at a start of the TxOP. In addition, one or more subframes can include a physical downlink control channel (PDCCH).

In one example, one DL subframe within the TxOP can include a HARQ feedback hold indication, and a following DL subframe within the TxOP can include a trigger for an ePUCCH transmission (e.g., an UL grant). The ePUCCH transmission can occur a defined number of subframes after the trigger or UL grant. More specifically, the trigger or UL grant can occur during a DL subframe within the TxOP (e.g., via DL downlink control information (DCI)), whereas the ePUCCH transmission performed by the UE can occur outside the TxOP.

In one configuration, MuLTEfire can incorporate a schedule based UL LAA design, in which an UL PUSCH transmission can be determined based on an explicit UL grant transmission to the UE via the PDCCH (e.g., via DCI format 0). After an eNodeB completes an LBT procedure on a component carrier over which the PUSCH transmission is expected, the UL grant transmission can be performed. After receiving the UL grant from the eNodeB, a scheduled UE can perform a short LBT or Category 4 LBT during an allocated time interval. However, in previous solutions, LAA UL throughput performance can be impacted. One reason for the performance degradation is due to the "double" LBT performed for UL transmissions, in which both the UE and the eNodeB perform LBT before transmission of the PUSCH. Therefore, providing additional opportunities for the PUSCH transmission outside the TxOP can improve the UL performance of LTE in the unlicensed spectrum.

Figure 3:
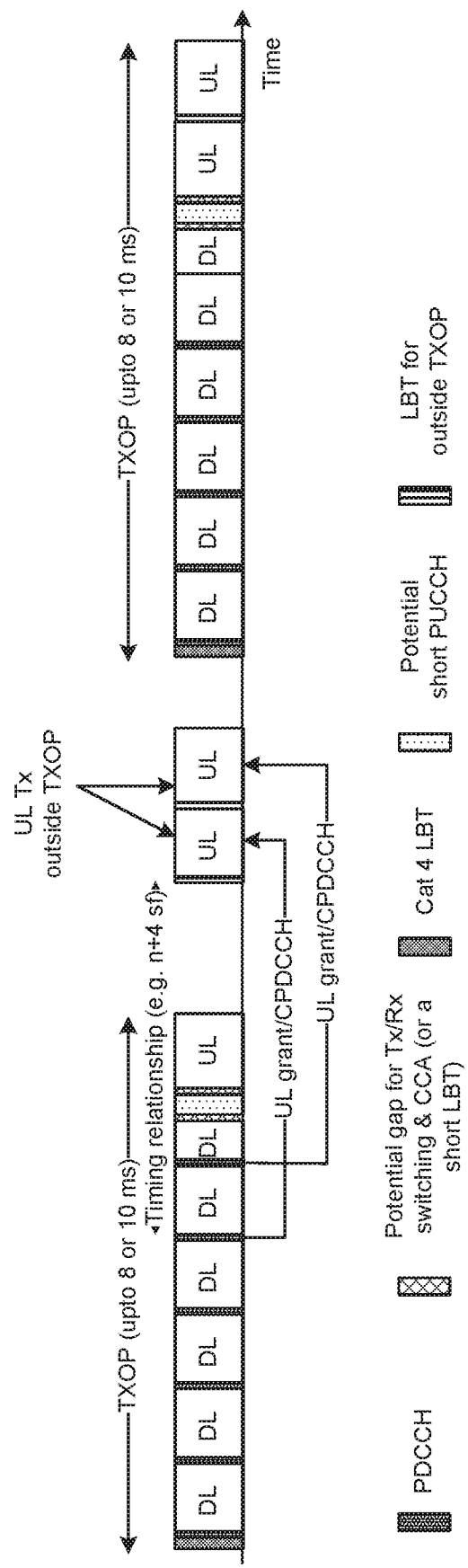
FIG. 3 illustrates an enhanced physical uplink shared channel (ePUSCH) transmission from a user equipment (UE) outside a transmission opportunity (TxOP) in accordance with an example.

FIG. 3 illustrates an example of an enhanced physical uplink shared channel (ePUSCH) transmission from a user equipment (UE) outside a transmission opportunity (TxOP). The TxOP can span a time period of 8 to 10 ms. The TxOP can include one or more DL subframes and one or more UL subframes, as well as a short PUCCH (sPUCCH) between a last DL subframe within the TxOP and a first UL subframe within the TxOP. The sPUCCH can be enclosed by potential gaps for transmit/receive (Tx/Rx) switching and a clear channel assessment (CCA) (or a short LBT). The eNodeB can perform a listen before talk (LBT) procedure, such as Category 4 LBT, at a start of the TxOP. In addition, one or more subframes can include a physical downlink control channel (PDCCH).

In one example, one or more DL subframes within the TxOP can include an UL grant or a common PDCCH (CPDCCH). The UL grant or CPDCCH can enable an UL transmission from the UE, and the UL transmission can occur a defined number of subframes after the UL grant or CPDCCH. For example, the UL transmission can occur 4 subframes after the UL grant or CPDCCH. As an example, the UL transmission can be a PUSCH transmission. The UL transmission can occur on an UL subframe that is outside the TxOP. In other words, the UL grant or CPDCCH can occur during a DL subframe within the TxOP, whereas the UL transmission (e.g., PUSCH transmission) performed by the UE can occur outside the TxOP. In addition, for each UL subframe outside the TxOP in which the UE performs an UL transmission, the UE can perform an LBT procedure.

In one configuration, an eNodeB can indicate a presence of an UL opportunity on a secondary cell (SCell) via an UL grant. The eNodeB can transmit the UL grant to a specific UE, and the UL grant can be transmitted in order to indicate an UL transmission to be performed by the UE outside the TxOP. The transmission of the UL grant can be performed on a same component carrier that is used for the UL transmission, or the UL grant can be transmitted on other component carriers (e.g., on a primary cell (PCell) when a licensed carrier is available).

In one example, the UL grant can indicate subframes to be used for the UL transmission. For example, an UL grant transmitted in subframe n can indicate that subframes from n+α to n+β, α<=β, α>=0 can be used for the UL transmission, wherein α and β are integers. In one non-limiting example, α=4 and β=4. In another example, the UL grant can indicate a type of UL transmission, e.g., a PUSCH transmission or ePUCCH transmission. In yet another example, the UL grant explicitly indicates times/frequency/code resources with the UL subframes.

Figure 4:
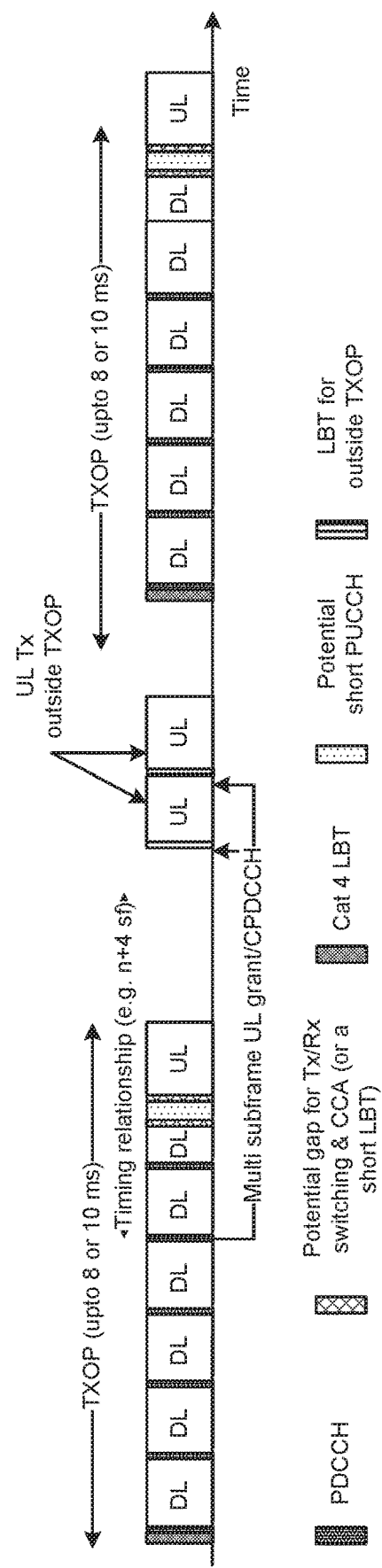
FIG. 4 illustrates uplink transmissions from a user equipment (UE) outside a transmission opportunity (TxOP) in accordance with an example.

FIG. 4 illustrates an example of uplink transmissions from a user equipment (UE) outside a transmission opportunity (TxOP). The TxOP can span a time period of 8 to 10 ms. The TxOP can include one or more DL subframes and one or more UL subframes, as well as a short PUCCH (sPUCCH) between a last DL subframe within the TxOP and a first UL subframe within the TxOP. The sPUCCH can be enclosed by potential gaps for transmit/receive (Tx/Rx) switching and a clear channel assessment (CCA) (or a short LBT). The eNodeB can perform a listen before talk (LBT) procedure, such as Category 4 LBT, at a start of the TxOP. In addition, one or more subframes can include a physical downlink control channel (PDCCH).

In one example, a DL subframe within the TxOP can include an UL grant or a common PDCCH (CPDCCH). The UL grant or CPDCCH can enable an UL transmission (e.g., PUSCH transmission) from the UE that spans multiple UL subframes, and the UL transmission can occur a defined number of subframes (e.g., 4 subframes) after the UL grant or CPDCCH. The indication of the UL transmission via the UL grant or the CDPCCH can occur on a same component carrier as that of the UL transmission.

In one example, the UL transmission can occur on an UL subframe that is outside the TxOP. In other words, the UL grant or CPDCCH can occur during a DL subframe within the TxOP, whereas the UL transmission (e.g., PUSCH transmission) performed by the UE can occur outside the TxOP. In addition, for each UL subframe outside the TxOP in which the UE performs an UL transmission, the UE can perform an LBT procedure.

Figure 5:
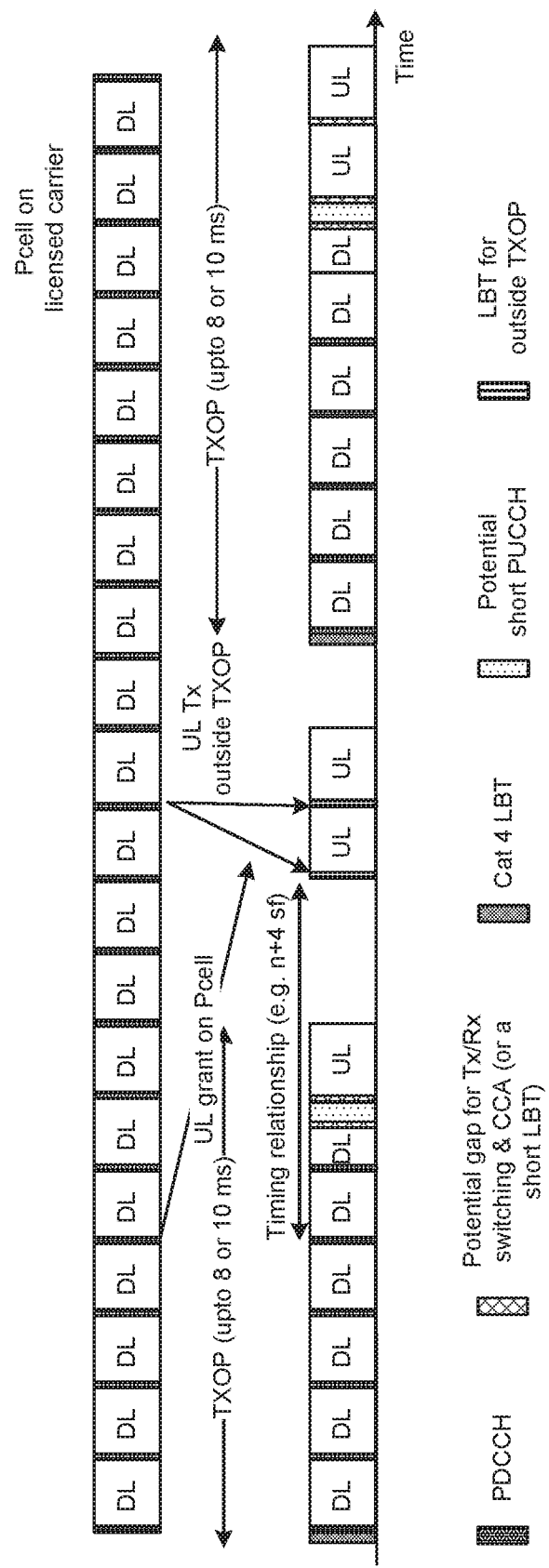
FIG. 5 illustrates an uplink transmission from a user equipment (UE) outside a transmission opportunity (TxOP) in accordance with an example.

FIG. 5 illustrates an example of uplink transmissions from a user equipment (UE) outside a transmission opportunity (TxOP). The TxOP can span a time period of 8 to 10 ms. The TxOP can include one or more DL subframes and one or more UL subframes, as well as a short PUCCH (sPUCCH) between a last DL subframe within the TxOP and a first UL subframe within the TxOP. The sPUCCH can be enclosed by potential gaps for transmit/receive (Tx/Rx) switching and a clear channel assessment (CCA) (or a short LBT). The eNodeB can perform a listen before talk (LBT) procedure, such as Category 4 LBT, at a start of the TxOP. In addition, one or more subframes can include a physical downlink control channel (PDCCH).

In one example, a DL subframe within the TxOP can include an UL grant or a common PDCCH (CPDCCH). The UL grant or CPDCCH can enable an UL transmission (e.g., PUSCH transmission) from the UE that spans multiple UL subframes, and the UL transmission can occur a defined number of subframes (e.g., 4 subframes) after the UL grant or CPDCCH. The indication of the UL transmission via the UL grant or the CDPCCH can occur on a different component carrier as that of the UL transmission. For example, the UL grant or the CPDCCH can be transmitted on a PCell on a licensed carrier, whereas the UL transmission (that occurs a defined number of subframes after the UL grant or CPDCCH) can be performed on an SCell on an unlicensed carrier. In addition, the UL transmission can occur on an UL subframe that is outside the TxOP.

In one configuration, an eNodeB can indicate a presence of an UL opportunity on a secondary cell (SCell) via the CPDCCH. The eNodeB can transmit the CPDCCH to a group of UEs (as opposed to an UL grant that is only transmitted to a specific UE), and the CPDCCH can be transmitted in order to indicate an UL transmission to be performed by the group of UEs outside the TxOP. The transmission of the CPDCCH can be performed on a same component carrier that is used for the UL transmission, or the CPDCCH can be transmitted on other component carriers (e.g., on a PCell when a licensed carrier is available).

In one example, the CPDCCH can indicate subframes to be used for the UL transmission. For example, a CPDCCH transmitted in subframe n can indicate that subframes from n+α to n+β, α<=β, α>=0 can be used for the UL transmission, wherein α and β are integers. In one non-limiting example, α=4 and β=4. In another example, the CPDCCH can indicate a type of UL transmission, e.g., a PUSCH transmission or ePUCCH transmission. In yet another example, each UE can be a priori configured with fixed resources within the UL subframes via an RRC configuration. The UE resources can be assigned orthogonal times/frequency/code resources with the UL subframes.

In one configuration, the UE can perform LBT before a PUSCH/ePUCCH transmission outside a TxOP in order to maintain fair co-existence with incumbent systems in the unlicensed spectrum and with other LAA networks. The eNodeB can indicate to the UE a type of LBT (e.g., single interval LBT or Category 4 LBT) to be used for the PUSCH/ePUCCH transmission outside the TxOP. The UE that intends to perform the PUSCH/ePUCCH transmission (based on an indication obtained from the CPDCCH or UL grant) can perform LBT in a first symbol of a subframe containing the PUSCH/ePUCCH transmission, or the UE can perform LBT in a last symbol of a previous subframes. The eNodeB and the UE can have a common knowledge regarding which symbol is to be used by the UE for performing LBT. A starting instant of the LBT and/or a start of the PUSCH/ePUCCH transmission can be explicitly indicated to the UE via the CPDCCH or UL grant.

In one example, the UE can perform single interval LBT within an interval explicitly or implicitly indicated to the UE. The UE can perform a single interval LBT for an interval of a point coordination function (PCF) interframe space (PIFS) or a distributed coordination function (DCF) interframe space (DIFS) before a start of the PUSCH/ePUCCH transmission. The PIFS can span 25 micro seconds (us) and the DIFS can span 34 us. The eNodeB can indicate whether the UL LBT is to be performed and/or skipped via the CPDCCH or via the UL grant.

Figure 6:
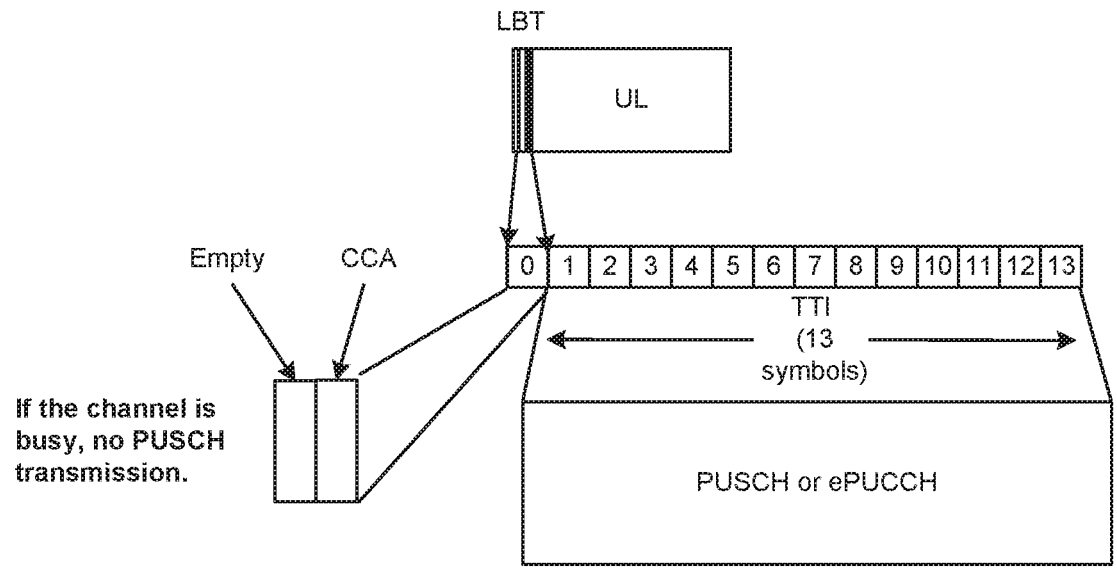
FIG. 6 illustrates listen-before-talk (LBT) procedures that are performed before an uplink transmission outside a transmission opportunity (TxOP) in accordance with an example.
Figure 6:
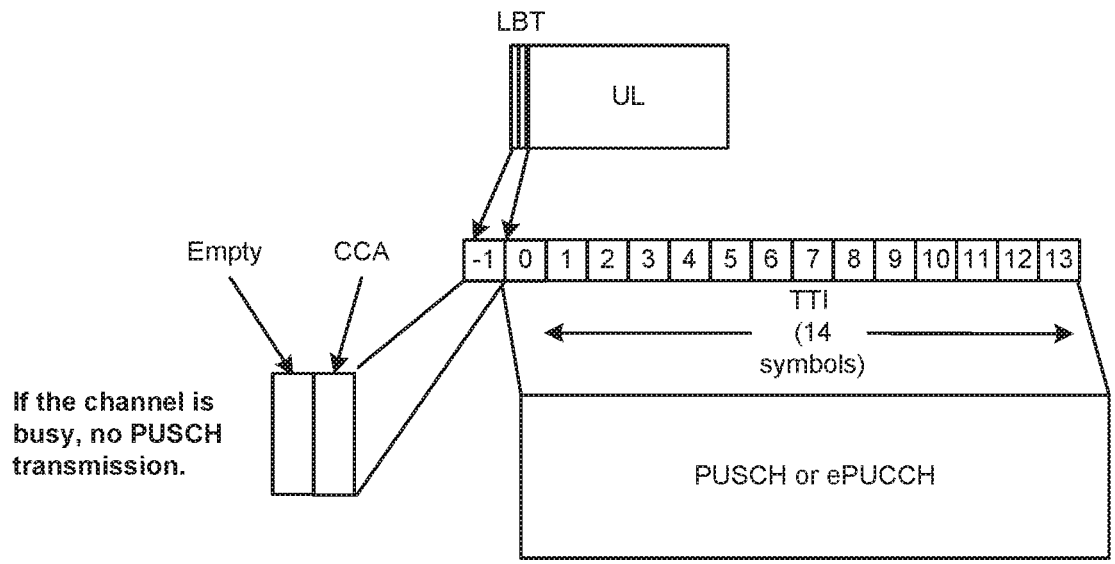

FIG. 6 illustrates examples of a listen-before-talk (LBT) procedure that is performed by a user equipment (UE) before an uplink (UL) transmission outside a transmission opportunity (TxOP). More specifically, the LBT procedure can be single interval UL LBT. The UE can perform LBT in a first symbol of a subframe containing the UL transmission, such as a PUSCH/ePUCCH transmission. Alternatively, the UE can perform LBT in a last symbol of a previous subframe (with respect to the subframe containing the UL transmission). The LBT can involve a clear channel assessment (CCA). If the UE determines that the channel is busy, then no PUSCH/ePUCCH transmission may be performed by the UE.

In one configuration, the UE can perform Category 4 LBT within an interval explicitly or implicitly indicated to the UE. For example, the UE can perform Category 4 LBT before a transmission of the PUSCH. Similar to the 3GPP Release 13 DL LBT procedure, the UE can perform a CCA and exponential backoff procedure. In one example, the UE can start performing LBT at any instant after detecting the PDCCH/ePDCCH for a corresponding subframe. In another example, the UE can start performing LBT at predefined instances, such as a start of a previous symbol before the PUSCH/ePUCCH transmission.

In one example, UL LBT can be performed at a start of a first symbol containing the PUSCH transmission, and the backoff counter can be between (0, 3). The contention window parameters, e.g., a value of a contention window or a random realization based on a contention window size, can be explicitly indicated to the UE via the CPDCCH or UL grant.

In one example, Category 4 LBT parameters and an energy detection (ED) threshold for UL LBT can be different than those used for DL LBT at the eNodeB. In another example, the Category 4 LBT parameters and ED threshold for UL LBT can be more conservative than those used for DL LBT at the eNodeB. For example, Category 4 LBT can use contention window sizes between (X,Y)=(3,7), while DL LBT can use (X,Y)=(15,1023). In yet another example, the Category 4 LBT parameters and ED threshold for UL LBT outside the TXOP can be more conservative than those used for UL LBT used within the TXOP. For example, Category 4 LBT can use contention window sizes between (X,Y)=(3,7), while DL LBT can use (X,Y)=(3,3).

In one configuration, after completion of the LBT, the UE can transmit a reservation signal until a start of the PUSCH/ePUCCH transmission.

Alternatively, the UE can skip the transmission of reservations signal and still align the PUSCH/ePUCCH transmission with a subframe boundary. In one example, rather than transmitting the reservation signals, the UE can align the PUSCH/ePUCCH transmission with the subframe boundary by performing self-deferral. After completion of a first LBT, the UE may not perform channel sensing until (x-CCA) micro seconds (us), wherein x represents an expected start of the PUSCH/ePUCCH transmission and CCA=25 us. Then, the UE can perform a second LBT (e.g., a single interval LBT) before a start of the PUSCH/ePUCCH transmission. After successful completion of LBT, the UE can perform the PUSCH/ePUSCH transmission. In another example, the UE may not count-down the random backoff counter, even when the channel is sensed idle. Rather, the UE can align its backoff counter such that an expected completion of the backoff procedure corresponds to a start of the expected PUSCH transmission.

Figure 7A:
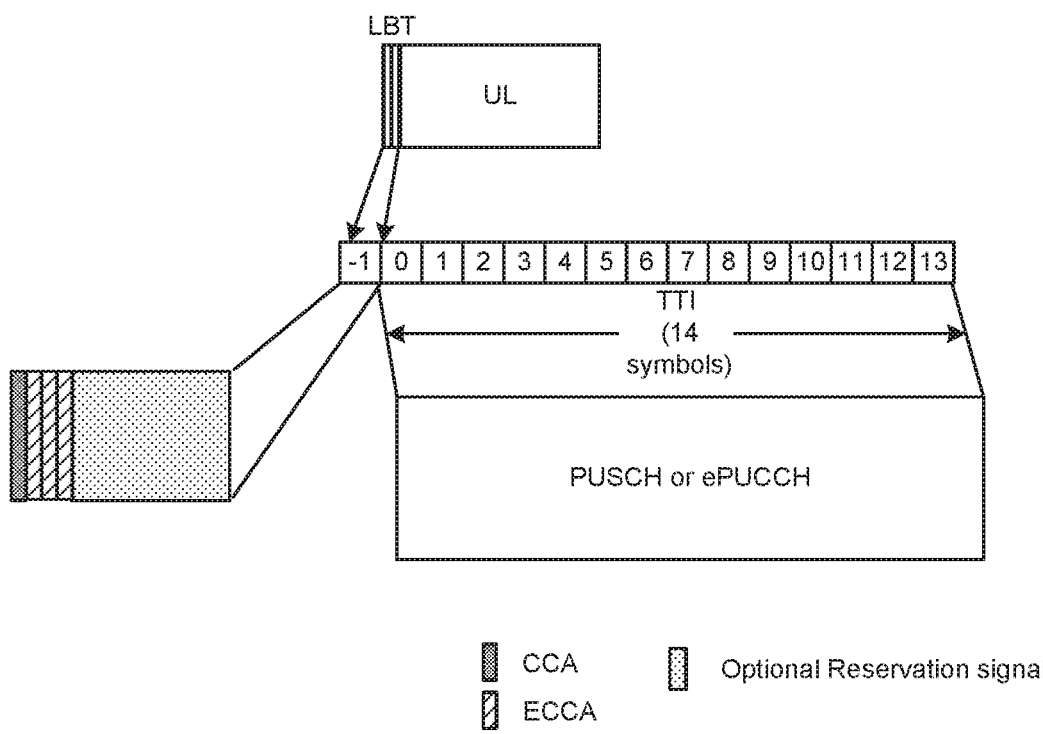
FIGS. 7A and 7B illustrate listen-before-talk (LBT) procedures that are performed before an uplink transmission outside a transmission opportunity (TxOP) in accordance with an example.
Figure 7B:
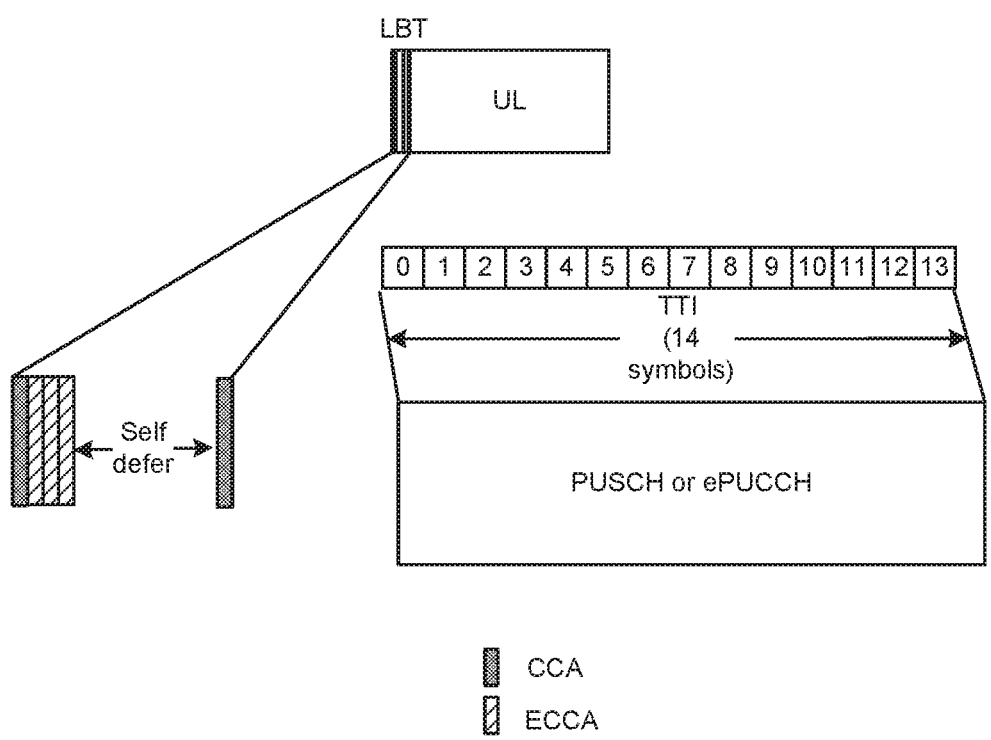

FIGS. 7A and 7B illustrate exemplary listen-before-talk (LBT) procedures that are performed by a user equipment (UE) before an uplink transmission outside a transmission opportunity (TxOP). For example, the UE can perform Category 4 UL LBT for a PUSCH transmission and/or an ePUCCH transmission. As shown in FIG. 7A, the UE can perform an LBT procedure, which can involve a clear channel assessment (CCA). After the LBT procedure is performed, the UE can transmit a reservation signal until a start of the PUSCH/ePUCCH transmission. As shown in FIG. 7B, the UE can perform a first LBT procedure. The UE can then transition into a self-defer mode, in which the UE does not perform channel sensing until a defined duration of time before an expected start of the PUSCH/ePUCCH transmission. Immediately before the start of the PUSCH/ePUCCH transmission, the UE can perform a second LBT. Then, the UE can perform the PUSCH/ePUCCH transmission.

In one configuration, a user equipment (UE) operating on an unlicensed spectrum can be capable of listen before talk (LBT). The UE can communicate with an enhanced node B (eNB) using a licensed medium and/or an unlicensed medium. The UE can sense the unlicensed medium before a physical UL shared channel (PUSCH) and a physical UL control channel (PUCCH). When the unlicensed medium is determined to be idle, the UE can perform a PUSCH or PUCCH transmission during a PUSCH/PUCCH schedule. When the unlicensed medium is determined to be busy, the UE can prevent the PUSCH/PUCCH transmission during the PUSCH/PUCCH schedule. The eNodeB can receive an uplink PUSCH/PUCCH transmission from the UE.

In one example, an UL transmission including PUSCH and PUCCH can be performed outside a transmission opportunity (TXOP) that does not immediately precede an LBT (e.g., Category 4 LBT) by the eNB. In another example, a common PDCCH (CPDCCH) or UL grant can be used to indicate the UL transmission outside the TXOP.

In one example, a transmission of the UL grant can be performed on a same component carrier that is used for the UL transmission, or can be transmitted on other component carriers (e.g., on a PCell when a licensed carrier is available). In another example, the UL grant can indicate the subframes to be used for the UL transmission. The UL grant transmitted in subframe n can indicate that subframes from n+α to n+β, α<=β, α>=0 can be used for the UL transmission, and in one non-limiting example, α=4, β=4. In yet another example, the UL grant can indicate a type of UL transmission e.g., PUSCH or PUCCH. In a further example, the UL grant can explicitly indicate times/frequency/code resources with the UL subframes.

In one example, a transmission of the CPDCCH can be performed on a same component carrier that is used for the UL transmission, or can be transmitted on other component carriers (e.g., on a PCell when a licensed carrier is available). In another example, the CPDCCH can indicate the subframes to be used for the UL transmission. The CPDCCH transmitted in subframe n can indicate that subframes from n+α to n+β, α<=β, α>=0 can be used for the UL transmission, and in one non-limiting example, α=4, β=4. In yet another example, the CPDCCH can indicate a type of UL transmission e.g., PUSCH or PUCCH.

In one example, each UE can be preconfigured with fixed resources within the UL subframes via an RRC configuration. In another example, UE resources can be assigned orthogonal times/frequency/code resources with the UL subframes. In yet another example, the UL transmission outside the TXOP can precede an LBT procedure. In a further example, the UE can perform a single interval LBT or a Category 4 LBT before the transmission of the PUSCH/PUCCH.

In one example, after receiving the UL grant or CPDCCH, the UE can perform LBT in a first symbol of a subframe containing the PUSCH/PUCCH, or a last symbol of a previous subframe. In another example, a starting instant of the LBT and/or a start of the PUSCH/PUCCH can be explicitly indicated to the UE via the CPDCCH or UL grant. In yet another example, if Category 4 LBT is used, contention window parameters of the PUSCH/PUCCH transmission can be explicitly indicated to the UE via the CPDCCH or UL grant. In a further example, after completion of the LBT, the UE can transmit a reservation signal until a start of the PUSCH/PUCCH transmission.

In one example, the UE can skip a transmission of the reservation signal and still align the PUSCH/PUCCH transmission with the subframe boundary. For example, after the completion of LBT, the UE may not perform channel sensing until (x-CCA) micro seconds (us), wherein x represents an expected start of the PUSCH/PUCCH transmission, and the clear channel assessment (CCA) is equal to 25 us. The UE then performs a single interval LBT before the start of the PUSCH/PUCCH. After successful completion of the LBT, the UE can perform the PUSCH/ePUSCH transmission. In another example, the UE may not count-down a random backoff counter even if the channel is sensed idle. The UE can align its backoff counter so that an expected completion of the backoff procedure corresponds to a start of the expected PUSCH transmission.

In one example, the Category 4 LBT parameters and an energy detection (ED) threshold for UL LBT can be different than those used for DL LBT at the eNodeB. In another example, the eNodeB can indicate a type of LBT (e.g., single interval LBT or Category 4 LBT) to be used for the PUSCH/PUCCH transmission outside the TXOP. In yet another example, the Category 4 LBT parameters and ED threshold for UL LBT outside the TxOP can be more different than those used for UL LBT within the TXOP.

Signaling of LBT Related Parameters

There are emerging interests in the operation of LTE systems in unlicensed spectrum. In 3GPP LTE Release 13, one enhancement has been to enable operation in the unlicensed spectrum via licensed-assisted access (LAA). LAA can expand the system bandwidth by utilizing a flexible carrier aggregation (CA) framework, as introduced in the LTE-Advanced system (3GPP LTE Release 10 system). Release 13 LAA focuses on the downlink (DL) design, while Release14 enhanced LAA (or eLAA) focuses on the uplink (UL) design. Further enhanced operation of LTE systems in the unlicensed spectrum is expected in upcoming LTE evolutions. In one example, LTE operation in the unlicensed spectrum can be achieved using dual connectivity (DC) based LAA. In another example, LTE operation in the unlicensed system can be achieved using a MuLTEfire system, which does not utilize an anchor in the licensed spectrum. The MuLTEfire system is a standalone LTE system that operates in the unlicensed spectrum. Therefore, Release 14 eLAA and MuLTEfire systems can potentially be significant evolutions in future wireless networks.

In one example, the unlicensed frequency band of current interest for 3GPP systems is the 5 gigahertz (GHz) band, which has wide spectrum with global common availability. The 5 GHz band in the United States is governed using Unlicensed National Information Infrastructure (U-NII) rules by the Federal Communications Commission (FCC), and the 5 GHz band is governed by the European Telecommunications Standards Institute (ETSI) in Europe. The main incumbent system in the 5 GHz band is the wireless local area networks (WLAN), specifically those based on the IEEE 802.11 a/n/ac technologies. WLAN systems are widely deployed both by individuals and operators for carrier-grade access service and data offloading.

Therefore, listen-before-talk (LBT) in the unlicensed spectrum is a mandatory feature in the Release 13 LAA system, which can enable fair coexistence with the incumbent system. LBT is a procedure in which radio transmitters first sense the medium, and transmit only if the medium is sensed to be idle. LBT can be performed at either the eNodeB or the UE prior to a transmission.

In one example, in 3GPP, the unlicensed spectrum can be applicable for downlink (DL) use cases as supplemental to the licensed primary carrier. In the past, 3GPP has focused on supporting LAA secondary cells (SCells) operating with only DL transmissions, and LAA functionalities including LBT have been limited to DL operations. However, LAA UL access and more generally LTE UL access over the unlicensed spectrum is expected to be a part of future 3GPP technology developments. The design of LBT to be performed by UEs is essential to enable the LTE UL access over the unlicensed spectrum. The LBT design for LTE UL access can be also reused for device-to-device (D2D) communication over the unlicensed spectrum.

The present technology relates to LBT designs for LTE UL access/D2D communication over the unlicensed spectrum. Specifically, the present technology relates to signaling between an LTE eNodeB and associated UEs to facilitate LBT operations to be performed at the UEs. Signaling information can include a LBT type, a mode of operation, parameters related to a selected LBT type and mode of operation, and LBT execution timing including a starting and ending instances, maximum transmission duration, etc.

In one configuration, an LTE eNodeB can signal control messages related to LBT for UL Access/D2D communication over the unlicensed spectrum. The LTE eNodeB can be in accordance with 3GPP LTE Release 13 or 14. In a first stage, an LTE eNodeB can determine an LBT type to be used for the UL access/D2D communication and a specific mode of operation. The possible LBT types can include, but are not limited to, no LBT, LBT without a random backoff, and LBT with a random backoff with fixed/variable contention window size. The mode of operation can include, but is not limited to an autonomous mode and an active mode. In a second stage, the LTE eNodeB can configure a set of LBT related parameters. The configured parameters can be the same for all UEs associated with the LTE eNodeB, or alternatively, the configured parameters can be specific to each UE. In a third stage, the LTE eNodeB can signal the configured set of LBT related parameters to the UE(s).

In the present technology, the LBT type and the mode of operation can be configured for UL access/D2D communications. When compared to a static scheme as found in previous technologies, which allows only one particular LBT type, the present technology enables flexible use of the LBT type and mode of operation, such that the system can cope with a dynamically changing unlicensed band environment in an improved manner as compared to previous technologies.

Figure 8:
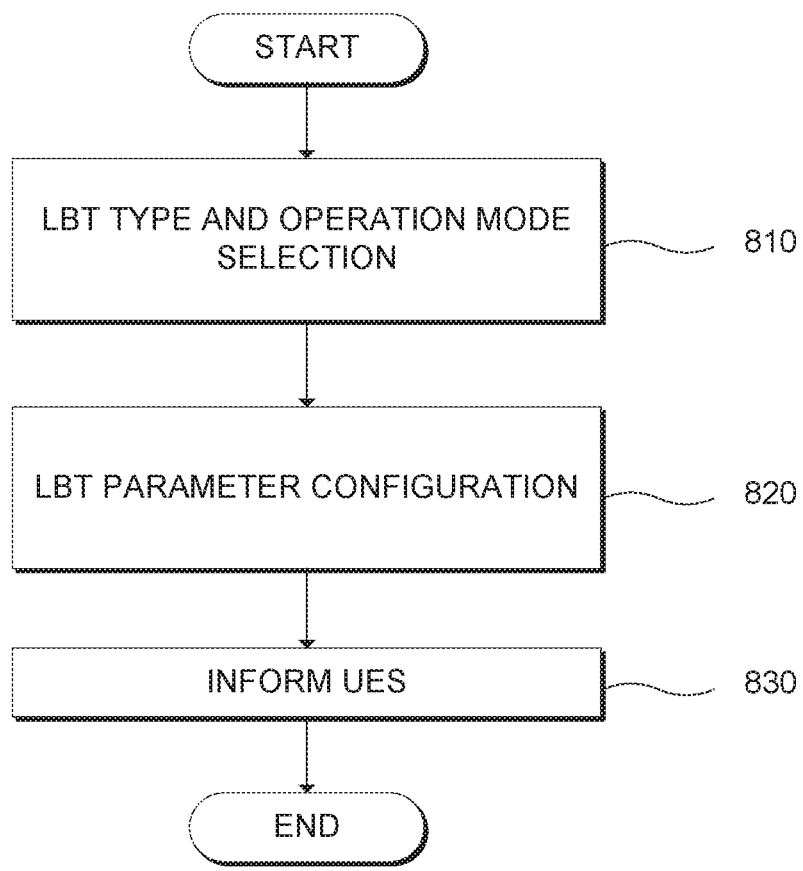
FIG. 8 illustrates a technique for selecting and signaling listen-before-talk (LBT) parameters from an eNodeB to a user equipment (UE) in accordance with an example.

FIG. 8 illustrates an exemplary technique for selecting and signaling listen-before-talk (LBT) parameters from an eNodeB to a user equipment (UE), which can enable the UE to perform LBT in accordance with the LBT parameters received from the eNodeB. As shown in block 802, an LTE eNodeB can determine a LBT type to be used by the UE and a mode of operation for the UE. The LBT type can be Category 1, Category 2, Category 3, or Category 4 LBT. The mode of operation can be an autonomous mode or a passive mode. In the autonomous mode, each UE can select certain LBT parameters (e.g., backoff counter) on its own. In the passive mode, UEs are requested to exactly follow instructions given by the eNodeB. The LBT type and the mode of operation may or may not be the same for all UEs associated with the LTE eNodeB. As shown in block 804, the LTE eNodeB can configure a set of LBT related parameters. The set of LBT related parameters can include the LBT type, the mode of operation, and parameters subject to the selected LBT type and mode of operation, such as a contention window size and/or backoff counters, timing to start and finish LBT, etc. The configured parameters may be the same for all UEs associated with the LTE eNodeB, or the configured parameters can be different from UE to UE. As shown in block 806, the LTE eNodeB can signal the configured set of LBT related parameters to the UEs. The configured set of LBT related parameters can be signaled to the UEs via, for example, layer 1 or layer 2 (L1/L2) signaling, such as a physical downlink control channel (PDCCH), an enhanced physical downlink control channel (ePDCCH), medium access control (MAC) control element (CE), radio resource control (RRC) signaling, or another type of higher layer signaling, including an additional system information block (SIB) transmission. The signaling can be conveyed over a licensed carrier or an unlicensed carrier. In addition, the signaling can be performed semi-statically or with every new UL scheduling grant, which can be either self-carrier scheduled or cross-carrier scheduled.

With respect to block 802, the LBT types selected by the LTE eNodeB can include the following: Category 1 LBT in which no LBT is performed by the UE, Category 2 LBT in which LBT is performed without a random backoff (e.g., single interval sensing), Category 3 LBT in which LBT is performed with a random backoff and a fixed contention window size, and Category 4 LBT in which LBT is performed with a random backoff and a variable contention window size. A random backoff number can be drawn uniformly and randomly given a contention window size (CWS). A UE can observe a drawn backoff counter number of idle slots in order to declare a CCA and to start a transmission. Under the variable size CWS, the CWS can be adapted upon an occurrence of a collision.

In one configuration, the selection of LBT types by the LTE eNodeB can depend on an occupied situation of the unlicensed spectrum. For example, a lightweight LBT type, such as Category 1 LBT or Category 2 LBT, can be selected by the LTE eNodeB when no or minimal radio access technology (RAT) activity is detected during a preconfigured observation window. For example, the lightweight LBT type can be selected when a level of RAT activity detected during the preconfigured observation window is below a defined threshold. Non-limiting examples of RAT activity can include WiFi or Bluetooth activity. The detection of a nearby incumbent system can be performed by the eNodeB, the UEs, or both by the eNodeB and the UEs. When the detection is performed by the UEs, the UEs can send feedback to the eNodeB regarding detection outcomes.

In another example, a more conservative LBT type, such as Category 3 LBT or Category 4 LBT, can be selected by the LTE eNodeB when an increased level of RAT activity is detected during the preconfigured observation window. For example, the more conservative LBT type can be selected when a level of RAT activity detected during the preconfigured observation window is above a defined threshold. In addition, the selection of the LBT type by the LTE eNodeB can be based on a collision rate. Further, the selected LBT type can be the same for all UEs associated with the LTE eNodeB, or the selected LBT type can vary from UE to UE.

In one example, the LTE eNodeB can determine the mode of operation for the UE(s). The mode of operation can be either autonomous or passive, and in one example, the mode of operation can apply to LBT types with random backoff only. Thus, this mode selection may not apply to Category 1 LBT or Category 2 LBT (e.g., the mode selection only applies to Category 3 LBT and Category 4 LBT). In the autonomous mode, each UE has the ability to select certain LBT related parameters on its own (i.e., without instruction by the LTE eNodeB). For example, with respect to Category 3 LBT, a UE can select a random backoff counter by its own given a fixed contention window size. With respect to Category 4 LBT, a UE can update its contention window size on its own (i.e., without instruction by the LTE eNodeB). In the passive mode, the LTE eNodeB can instruct the UEs on exactly which LBT behaviors to follow, including the random backoff counter and the contention window size. In addition, the selected mode of operation can be the same for all UEs associated with the LTE eNodeB, or the selected LBT type can vary from UE to UE.

With respect to block 804, the LTE eNodeB can configure a set of LBT related parameters after selection of the LBT type and operation mode. The configured LBT related parameters can be the same for all UEs associated with the LTE eNodeB, or the selected LBT type can vary from UE to UE.

In one example, when Category 1 LBT is selected by the LTE eNodeB, the set of LBT related parameters to be signaled to the UEs can include the LBT type, etc. An instance to begin an UL transmission can be included in an UL grant. Therefore, when the UEs are signaled to use Category 1 LBT, scheduled UEs can start their transmission without performing channel sensing.

In one example, when Category 2 LBT is selected by the LTE eNodeB, the set of LBT related parameters to be signaled to the UEs can include the LBT type, an instance to perform single interval channel sensing, etc. Therefore, when a scheduled UE detects a medium idle at an indicated sensing instance, the UE can start an UL transmission, as indicated by an UL grant. Otherwise, the UL transmission can be aborted.

In one example, when autonomous mode Category 3 LBT is selected by the LTE eNodeB, the set of LBT related parameters to be signaled to the UEs can include the LBT type, an instance to start/finish LBT, a contention window size to be utilized at the UE, etc. Each UE can draw its own random backoff counter using the signaled contention window size. If a scheduled UE can finish LBT during the indicated time interval to perform LBT, the UE can start an UL transmission, as indicated by UL grant. Otherwise, the UL transmission can be aborted.

In one example, when autonomous mode Category 4 LBT is selected by the LTE eNodeB, the set of LBT related parameters to be signaled to the UEs can include the LBT type, an instance to start/finish LBT, a minimum and maximum contention window size to be utilized at the UE, etc. Each UE can autonomously update its contention window size and draw its own random backoff counter. In one example, the LTE eNodeB can indicate a certain LBT priority class for the UE(s) to use when performing LBT. Each LBT priority class can have a minimum and maximum contention window size. The LBT priority classes can range from high priority to low priority (e.g., Priority 1 can have a highest priority, and can be associated with a smallest minimum/maximum contention window size). When a higher LBT priority class is used, a channel occupancy time can be reduced. When a lower LBT priority class is used, a contention window size can be increased. Further, if a scheduled UE can finish LBT during the indicated time period to perform LBT, the UE can start an UL transmission, as indicated by UL grant. Otherwise, the UL transmission can be aborted.

In one example, when passive mode Category 3 LBT or Category 4 LBT is selected by the LTE eNodeB, the set of LBT related parameters to be signaled to the UEs can include the LBT type, an instance to start/finish LBT, an exact backoff counter to be used by the UEs, etc. If a scheduled UE can finish LBT during the indicated time period to perform LBT, the UE can start an UL transmission, as indicated by UL grant. Otherwise, the UL transmission can be aborted.

In one example, for Category 2, 3, and 4 LBT types, the LTE eNodeB can additionally indicate a maximum transmission duration for UL access, wherein a UE can continue to transmit without performing additional LBT when an initial LBT is successful.

With respect to block 806, the LTE eNodeB can signal the configured set of LBT related parameters to the UEs. In one example, the configured set of LBT related parameters can be signaled to the UEs via, for example, layer 1 or layer 2 (L1/L2) signaling, such as a physical downlink control channel (PDCCH), an enhanced physical downlink control channel (ePDCCH), medium access control (MAC) control element (CE), radio resource control (RRC) signaling, or another type of higher layer signaling, including an additional system information block (SIB) transmission. In another example, when the LBT related parameters are the same for all UEs associated with the LTE eNodeB, a common signaling to all associated UEs can be performed by the LTE eNodeB. Otherwise, the LTE eNodeB can perform signaling on a per-UE basis.

In one example, the LBT type and mode of operation can be configured semi-statically or dynamically. When the LBT type and mode of operation are configured dynamically, the LBT related parameters can be signaled with each new UL scheduling grant, which can be either self-carrier scheduled or cross-carrier scheduled. Otherwise, the LBT related parameters can be signaled semi-statically when an update is due. An update time period and/or update triggering events can be configured accordingly. In addition, the signaling can be conveyed over licensed carrier or unlicensed carrier either with self-carrier scheduling or cross-carrier scheduling.

In one configuration, an eNodeB can signal control messages related to listen-before-talk (LBT) for uplink (UL) access/device-to-device (D2D) communications over an unlicensed spectrum. The eNodeB can perform an LBT type and operation mode selection. The eNodeB can configure LBT parameters based on the LBT type and the operation mode. The eNodeB can signal the LBT parameters to a user equipment (UE).

In one example, the eNodeB can select the type of the LBT, which can include no LBT, a single interval LBT, an LBT with a random backoff counter and fixed contention window size, and an LBT with a random backoff counter and variable contention window size.

In one example, the eNodeB can select a certain type of LBT, such as no LBT or an LBT with a random backoff counter and a minimal contention window size (e.g., single interval LBT), when no or minimal incumbent system activity is detected during a preconfigured observation window. In another example, the eNodeB can select a certain type of LBT, such as an LBT with a random backoff counter and a fixed/variable contention window size, when an increased level of incumbent system activity is detected during the preconfigured observation window. In yet another example, the detection of the incumbent system activity can be performed by the eNodeB, the UE, or both the eNodeB and the UE.

In one example, the eNodeB can select an autonomous or passive mode of operation. The UE can select certain LBT related parameters in the autonomous mode. Alternatively, the UE can perform exact LBT behaviors as instructed by the eNodeB under the passive mode.

In one example, the eNodeB can configure LBT related parameters. The LBT related parameters can include the LBT type, the mode of operation, a time instance/period to perform LBT, a contention window size, a minimum/maximum contention window size, a backoff counter, etc. In another example, the UE can configure a portion or all of the LBT related parameters. In yet another example, the eNodeB can configure the same LBT related parameters for a group of UEs, or the eNodeB can configure UE-specific LBT related parameters.

In one example, the eNodeB can utilize common signaling for associated UEs, or the eNodeB can utilize per-UE signaling. In another example, the eNodeB can perform signaling via a layer 1/layer 2 (L1/L2) PDCCH, medium access control (MAC) control element (CE), radio resource control (RRC) signaling or other types of higher layer signaling. In yet another example, the eNodeB can configure the LBT related parameters semi-statically or dynamically. In a further example, signaling from the eNodeB can be performed over a licensed carrier or an unlicensed carrier with self-carrier scheduling or cross-carrier scheduling.

Figure 9:
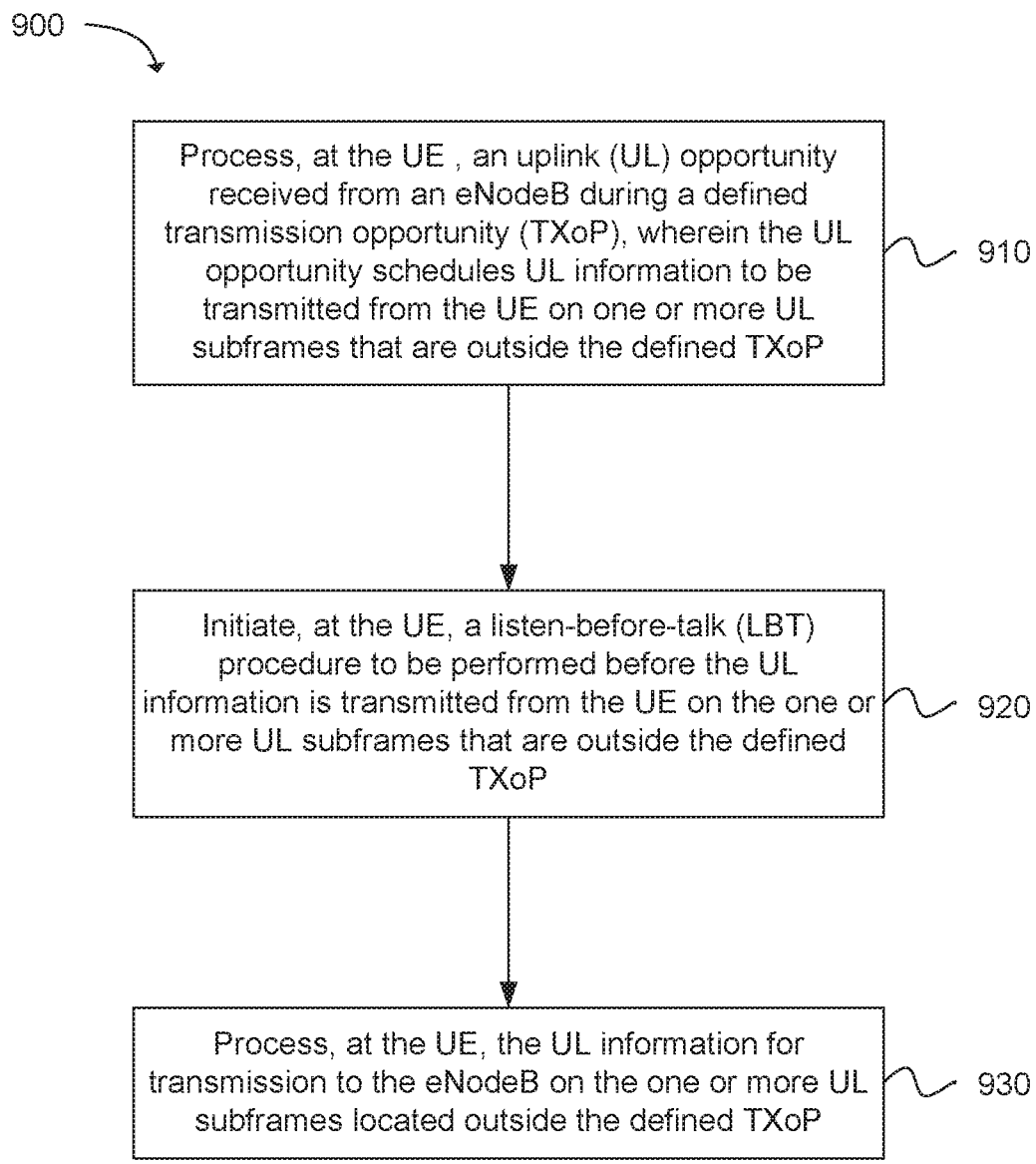
FIG. 9 depicts functionality of a user equipment (UE) operable to perform uplink (UL) transmissions outside a transmission opportunity (TxOP) in accordance with an example.

Another example provides functionality 900 of a user equipment (UE) operable to perform uplink (UL) transmissions outside a transmission opportunity (TxOP), as shown in FIG. 9. The UE can comprise one or more processors and memory configured to: process, at the UE, an uplink (UL) opportunity received from an eNodeB during a defined transmission opportunity (TxOP), wherein the UL opportunity schedules UL information to be transmitted from the UE on one or more UL subframes that are outside the defined TxOP, as in block 910. The UE can comprise one or more processors and memory configured to: initiate, at the UE, a listen-before-talk (LBT) procedure to be performed before the UL information is transmitted from the UE on the one or more UL subframes that are outside the defined TxOP, as in block 920. The UE can comprise one or more processors and memory configured to: process, at the UE, the UL information for transmission to the eNodeB on the one or more UL subframes located outside the defined TxOP, as in block 930.

Figure 10:
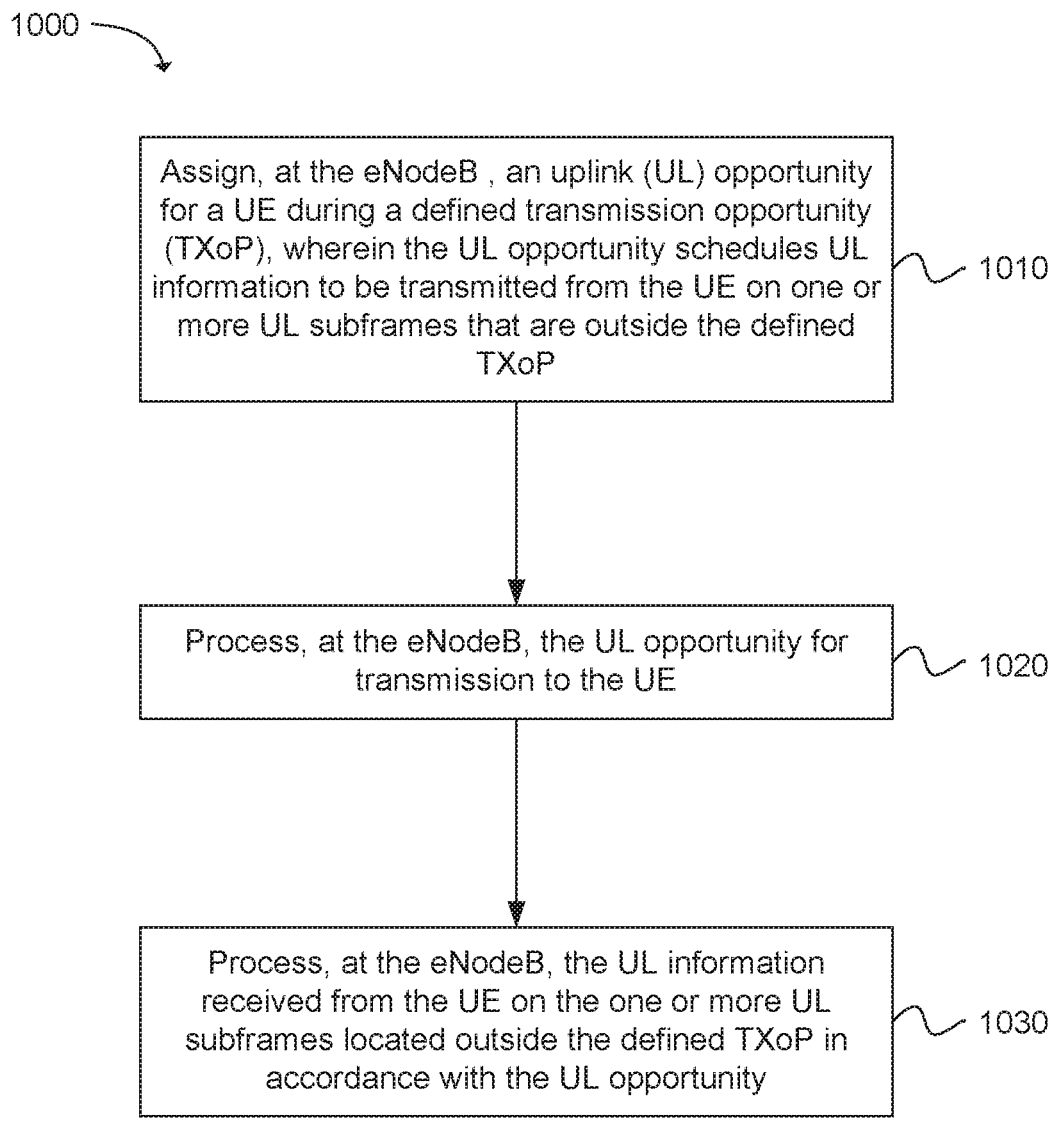
FIG. 10 depicts functionality of an eNodeB operable to perform scheduling for a user equipment (UE) in accordance with an example.

Another example provides functionality 1000 of an eNodeB operable to perform scheduling for a user equipment (UE), as shown in FIG. 10. The eNodeB can comprise one or more processors and memory configured to: assign, at the eNodeB, an uplink (UL) opportunity for a UE during a defined transmission opportunity (TxOP), wherein the UL opportunity schedules UL information to be transmitted from the UE on one or more UL subframes that are outside the defined TxOP, as in block 1010. The eNodeB can comprise one or more processors and memory configured to: process, at the eNodeB, the UL opportunity for transmission to the UE, as in block 1020. The eNodeB can comprise one or more processors and memory configured to: process, at the eNodeB, the UL information received from the UE on the one or more UL subframes located outside the defined TxOP in accordance with the UL opportunity, as in block 1030.

Figure 11:
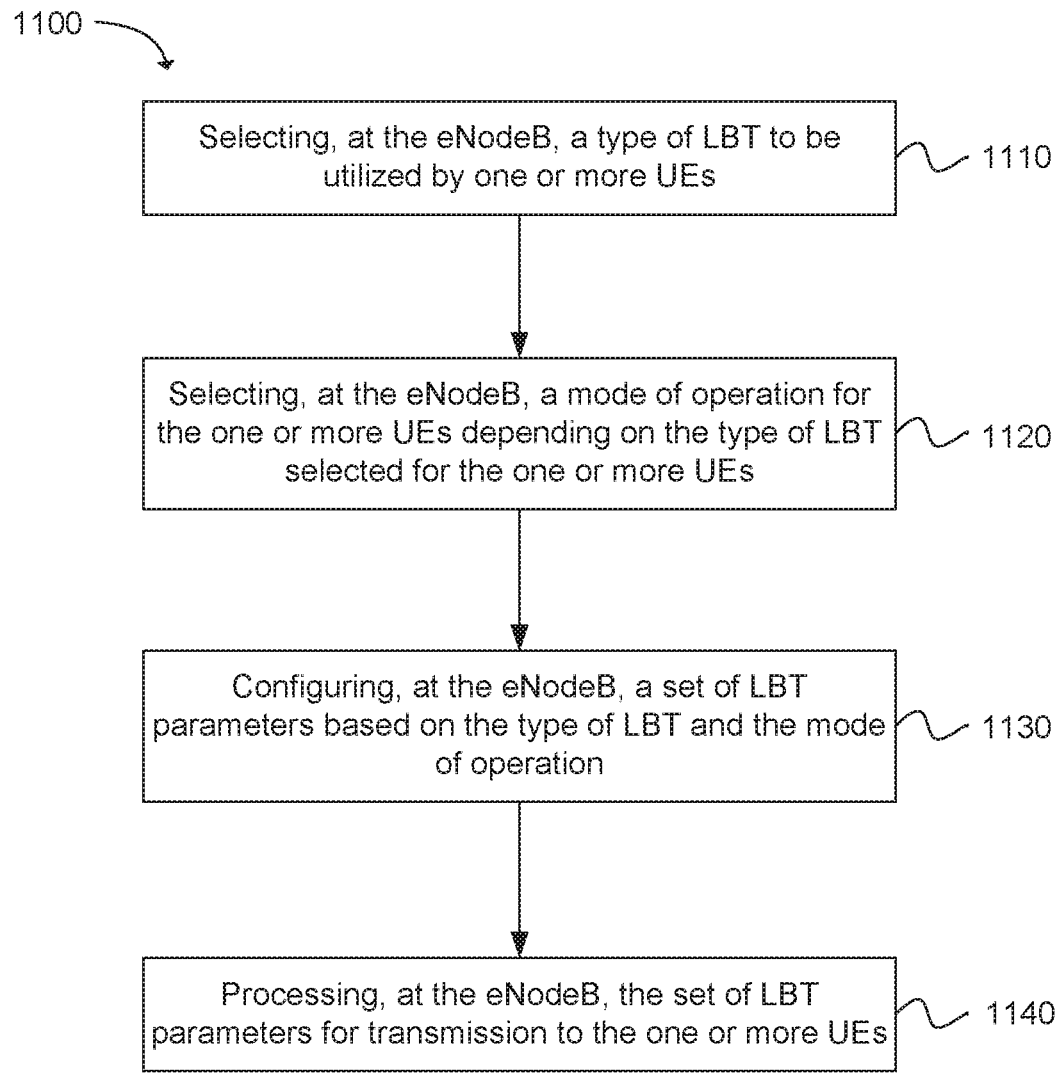
FIG. 11 depicts a flowchart of a machine readable storage medium having instructions embodied thereon for signaling listen-before-talk (LBT) parameters from an eNodeB to a user equipment (UE) in accordance with an example.

Another example provides at least one machine readable storage medium having instructions 1100 embodied thereon for signaling listen-before-talk (LBT) parameters from an eNodeB to a user equipment (UE), as shown in FIG. 11. The instructions can be executed on a machine, where the instructions are included on at least one computer readable medium or one non-transitory machine readable storage medium. The instructions when executed perform: selecting, at the eNodeB, a type of LBT to be utilized by one or more UEs, as in block 1110. The instructions when executed perform: selecting, at the eNodeB, a mode of operation for the one or more UEs depending on the type of LBT selected for the one or more UEs, as in block 1120. The instructions when executed perform: configuring, at the eNodeB, a set of LBT parameters based on the type of LBT and the mode of operation, as in block 1130. The instructions when executed perform: processing, at the eNodeB, the set of LBT parameters for transmission to the one or more UEs, as in block 1140.

Figure 12:
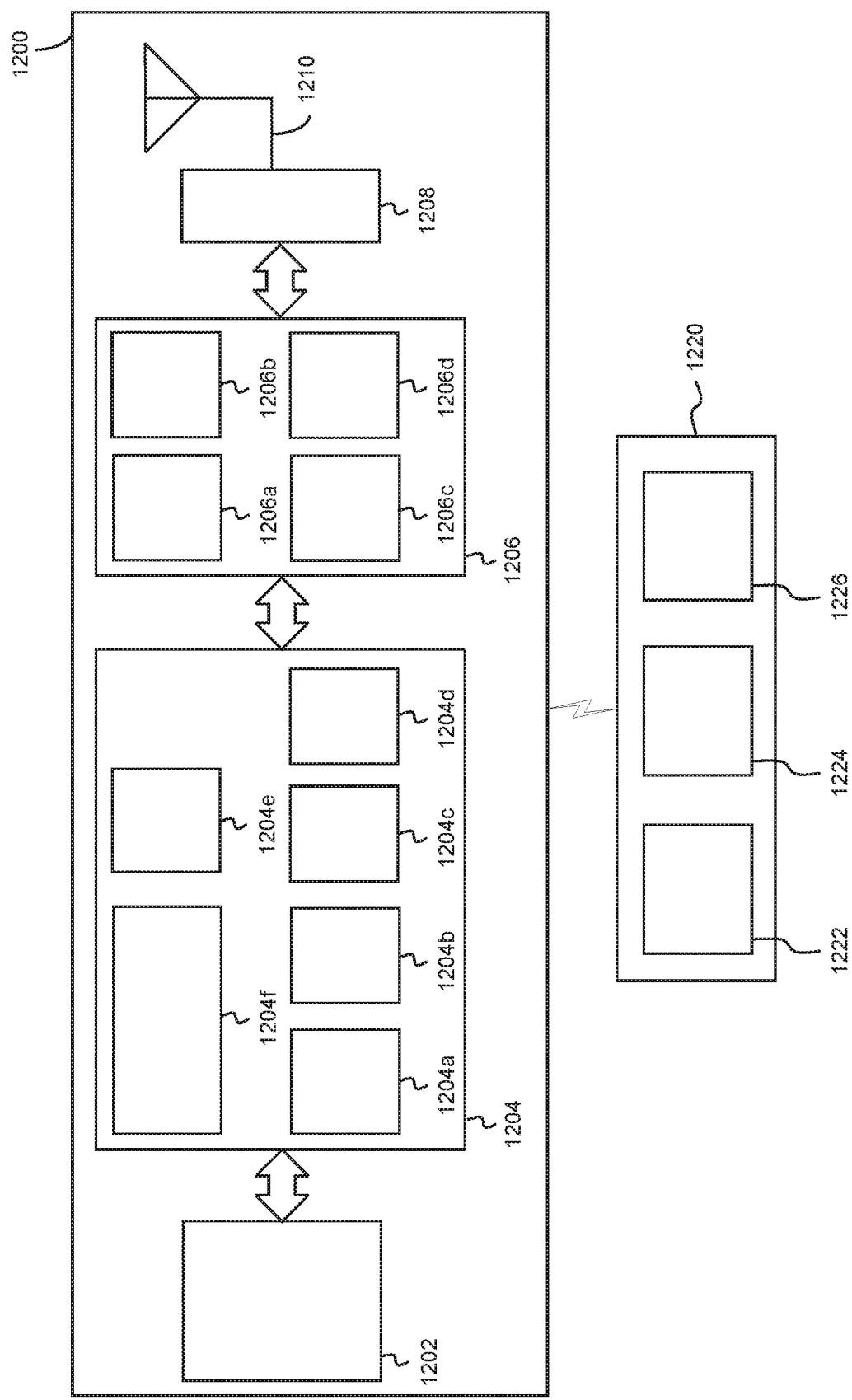
FIG. 12 illustrates a diagram of a wireless device (e.g., UE) and a base station (e.g., eNodeB) in accordance with an example.

FIG. 12 provides an example illustration of a user equipment (UE) device 1200 and a node 1220. The UE device 1200 can include a wireless device, a mobile station (MS), a mobile wireless device, a mobile communication device, a tablet, a handset, or other type of wireless device. The UE device 1200 can include one or more antennas configured to communicate with the node 1220 or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The node 1220 can include one or more processors 1222, memory 1224 and a transceiver 1226. The UE device 1200 can be configured to communicate using at least one wireless communication standard including 3GPP LTE, WiMAX, High Speed Packet Access (HSPA), Bluetooth, and WiFi. The UE device 1200 can communicate using separate antennas for each wireless communication standard or shared antennas for multiple wireless communication standards. The UE device 1200 can communicate in a wireless local area network (WLAN), a wireless personal area network (WPAN), and/or a WWAN.

In some embodiments, the UE device 1200 may include application circuitry 1202, baseband circuitry 1204, Radio Frequency (RF) circuitry 1206, front-end module (FEM) circuitry 1208 and one or more antennas 1210, coupled together at least as shown. In addition, the node 1220 may include, similar to that described for the UE device 1200, application circuitry, baseband circuitry, Radio Frequency (RF) circuitry, front-end module (FEM) circuitry and one or more antennas The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium, and may be configured to execute instructions stored in the storage medium to enable various applications and/or operating systems to run on the system.

The baseband circuitry 1204 may include circuitry such as, but not limited to, one or more single-core or multi-core processors. The baseband circuitry 1204 may include one or more baseband processors and/or control logic to process baseband signals received from a receive signal path of the RF circuitry 1206 and to generate baseband signals for a transmit signal path of the RF circuitry 1206. Baseband processing circuity 1204 may interface with the application circuitry 1202 for generation and processing of the baseband signals and for controlling operations of the RF circuitry 1206. For example, in some embodiments, the baseband circuitry 1204 may include a second generation (2G) baseband processor 1204*a*, third generation (3G) baseband processor 1204*b*, fourth generation (4G) baseband processor 1204*c*, and/or other baseband processor(s) 1204*d* for other existing generations, generations in development or to be developed in the future (e.g., fifth generation (5G), 6G, etc.). The baseband circuitry 1204 (e.g., one or more of baseband processors 1204*a-d*) may handle various radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, and/or constellation mapping/demapping functionality. In some embodiments, encoding/decoding circuitry of the baseband circuitry 1204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1204*e* of the baseband circuitry 1204 may be configured to run elements of the protocol stack for signaling of the PHY, MAC, RLC, PDCP and/or RRC layers. In some embodiments, the baseband circuitry may include one or more audio digital signal processor(s) (DSP) 1204*f*. The audio DSP(s) 104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

The RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the RF circuitry 1206 may include a receive signal path and a transmit signal path. The receive signal path of the RF circuitry 1206 may include mixer circuitry 1206a, amplifier circuitry 1206b and filter circuitry 1206c. The transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a necessity. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c. The filter circuitry 1206c may include a low-pass filter (LPF), although the scope of the embodiments is not limited in this respect.

In some embodiments, the mixer circuitry 1206a of the receive signal path and the mixer circuitry 1206a of the transmit signal path may include two or more mixers and may be arranged for quadrature down-conversion and/or up-conversion respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct down-conversion and/or direct up-conversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a necessity. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210.

Figure 13:
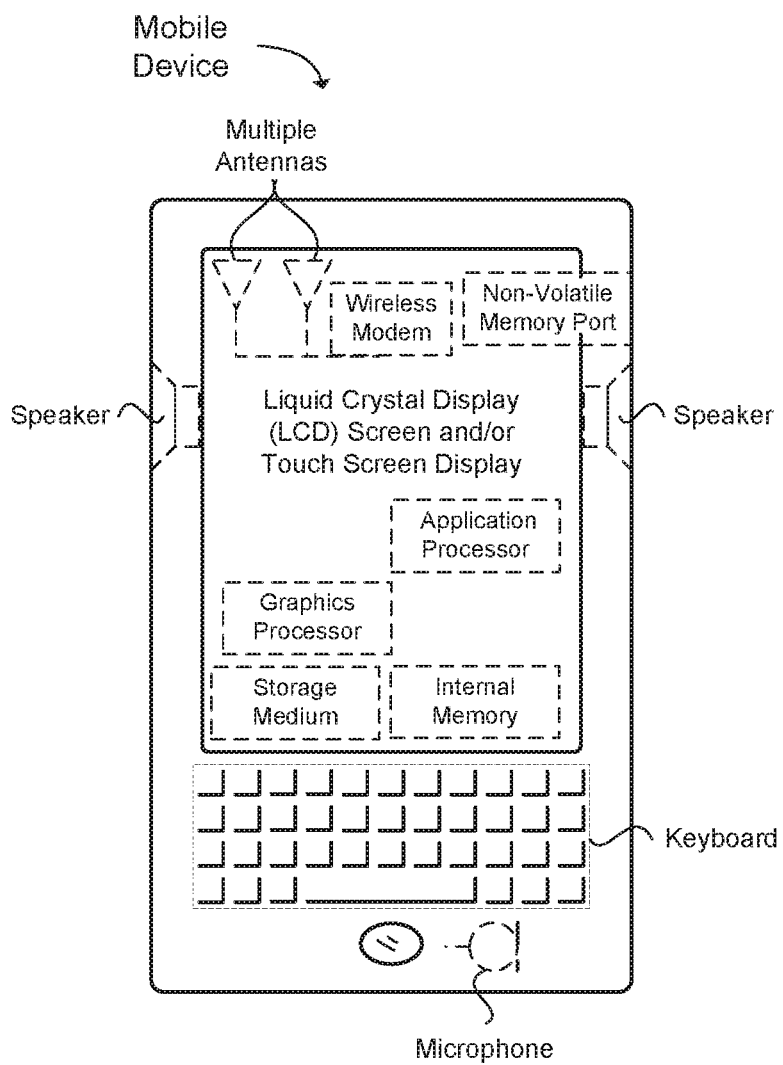
FIG. 13 illustrates a diagram of a wireless device (e.g., UE) in accordance with an example.

FIG. 13 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 13 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to perform uplink (UL) transmissions outside a transmission opportunity (TxOP), the apparatus comprising one or more processors and memory configured to: process, at the UE, an uplink (UL) opportunity received from an eNodeB during a defined transmission opportunity (TxOP), wherein the UL opportunity schedules UL information to be transmitted from the UE on one or more UL subframes that are outside the defined TxOP; initiate, at the UE, a listen-before-talk (LBT) procedure to be performed before the UL information is transmitted from the UE on the one or more UL subframes that are outside the defined TxOP; and process, at the UE, the UL information for transmission to the eNodeB on the one or more UL subframes located outside the defined TxOP.

Example 2 includes the apparatus of Example 1, further comprising a transceiver configured to: receive the UL opportunity from the eNodeB; and transmit the UL information on the one or more UL subframes located outside the defined TxOP in accordance with the UL opportunity.

Example 3 includes the apparatus of any of Examples 1 to 2, wherein the UL opportunity is received from the eNodeB via an UL grant on a downlink (DL) subframe during the TxOP or via a common physical downlink control channel (cPDCCH) on the DL subframe during the TxOP.

Example 4 includes the apparatus of any of Examples 1 to 3, wherein the UL information transmitted outside the TxOP is transmitted via one of: a physical uplink control channel (PUCCH), a physical uplink shared channel (PUSCH), an enhanced physical uplink control channel (ePUCCH), or an enhanced physical uplink shared channel (ePUSCH).

Example 5 includes the apparatus of any of Examples 1 to 4, further comprising one or more processors and memory configured to process, at the UE, one or more reservation signals for transmission after the LBT procedure is performed at the UE and before the UL information is transmitted from the UE outside the defined TxOP.

Example 6 includes the apparatus of any of Examples 1 to 5, further comprising one or more processors and memory configured to initiate, at the UE, a second LBT procedure to be performed before the UL information is transmitted from the UE outside the defined TxOP.

Example 7 includes the apparatus of any of Examples 1 to 6, wherein the UL opportunity is utilized by the UE that operates in an enhanced Licensed-Assisted Access (LAA) system, or in a MuLTEfire system that operates in an unlicensed spectrum without utilizing an anchor in a licensed spectrum.

Example 8 includes an apparatus of an eNodeB operable to perform scheduling for a user equipment (UE), the apparatus comprising one or more processors and memory configured to: assign, at the eNodeB, an uplink (UL) opportunity for a UE during a defined transmission opportunity (TxOP), wherein the UL opportunity schedules UL information to be transmitted from the UE on one or more UL subframes that are outside the defined TxOP; process, at the eNodeB, the UL opportunity for transmission to the UE; and process, at the eNodeB, the UL information received from the UE on the one or more UL subframes located outside the defined TxOP in accordance with the UL opportunity.

Example 9 includes the apparatus of Example 8, further comprising a transceiver configured to: transmit the UL opportunity to the UE; and receive, from the UE, the UL information on the one or more UL subframes located outside the defined TxOP based on the UL opportunity.

Example 10 includes the apparatus of any of Examples 8 to 9, wherein the UL opportunity is transmitted from the eNodeB via an UL grant on a downlink (DL) subframe during the TxOP or via a common physical downlink control channel (cPDCCH) on the DL subframe during the TxOP.

Example 11 includes the apparatus of any of Examples 8 to 10, wherein the UL information received from the UE outside the defined TxOP is received via one of: a physical uplink control channel (PUCCH), a physical uplink shared channel (PUSCH), an enhanced physical uplink control channel (ePUCCH), or an enhanced physical uplink shared channel (ePUSCH).

Example 12 includes the apparatus of any of Examples 8 to 11, wherein the one or more processors and memory are further configured to initiate, at the eNodeB, a listen-before-talk (LBT) procedure to be performed at a start of the defined TxOP.

Example 13 includes the apparatus of any of Examples 8 to 12, wherein: the UL opportunity is transmitted using a component carrier that is utilized to receive the UL information; or the UL opportunity is transmitted using a component carrier that is different than a component carrier utilized to receive the UL information.

Example 14 includes at least one machine readable storage medium having instructions embodied thereon for signaling listen-before-talk (LBT) parameters from an eNodeB to a user equipment (UE), the instructions when executed by one or more processors perform the following: selecting, at the eNodeB, a type of LBT to be utilized by one or more UEs; selecting, at the eNodeB, a mode of operation for the one or more UEs depending on the type of LBT selected for the one or more UEs; configuring, at the eNodeB, a set of LBT parameters based on the type of LBT and the mode of operation; and processing, at the eNodeB, the set of LBT parameters for transmission to the one or more UEs.

Example 15 includes the at least one machine readable storage medium of Example 14, wherein the type of LBT includes one of: a Category 1 LBT in which no LBT is performed, a Category 2 LBT in which LBT is performed without a random backoff, a Category 3 LBT in which LBT is performed with a random backoff and a fixed contention window size, and a Category 4 LBT in which LBT is performed with a random backoff and a variable contention window size.

Example 16 includes the at least one machine readable storage medium of any of Examples 14 to 15, further comprising instructions when executed by the one or more processors perform the following: selecting the type of LBT to be utilized by the one or more UEs based on a level of radio access technology (RAT) activity during a preconfigured observation window.

Example 17 includes the at least one machine readable storage medium of any of Examples 14 to 16, further comprising instructions when executed by the one or more processors perform the following: selecting a Category 1 LBT or a Category 2 LBT when the level of RAT activity during the preconfigured observation is below a defined threshold; or selecting a Category 3 LBT or a Category 4 LBT when the level of RAT activity during the preconfigured observation is above the defined threshold.

Example 18 includes the at least one machine readable storage medium of any of Examples 14 to 17, wherein the mode of operation includes an autonomous mode or a passive mode, wherein the autonomous mode permits the one or more UEs to select certain LBT parameters, wherein the passive mode prohibits the one or more UEs from selecting LBT parameters.

Example 19 includes the at least one machine readable storage medium of any of Examples 14 to 18, wherein the autonomous mode is applicable to a Category 3 LBT and a Category 4 LBT, and the passive mode is applicable to a Category 3 LBT and a Category 4 LBT.

Example 20 includes the at least one machine readable storage medium of any of Examples 14 to 19, wherein the set of LBT parameters include at least one of: the type of LBT, the mode of operation, a time instance or period to perform LBT, a contention window size, a minimum and maximum contention window size with respect to an LBT priority class, the LBT priority class and a backoff counter.

Example 21 includes the at least one machine readable storage medium of any of Examples 14 to 20, wherein the set of LBT parameters are transmitted to the one or more UEs using common signaling or UE-specific signaling Example 22 includes the at least one machine readable storage medium of any of Examples 14 to 21, wherein the set of LBT parameters are transmitted to the one or more UEs via an uplink (UL) scheduling grant when the type of LBT and the mode of operation are configured dynamically at the eNodeB.

Example 23 includes an eNodeB operable to signal listen-before-talk (LBT) parameters to a user equipment (UE), the eNodeB comprising: means for selecting, at the eNodeB, a type of LBT to be utilized by one or more UEs; means for selecting, at the eNodeB, a mode of operation for the one or more UEs depending on the type of LBT selected for the one or more UEs; means for configuring, at the eNodeB, a set of LBT parameters based on the type of LBT and the mode of operation; and means for processing, at the eNodeB, the set of LBT parameters for transmission to the one or more UEs.

Example 24 includes the eNodeB of Example 23, wherein the type of LBT includes one of: a Category 1 LBT in which no LBT is performed, a Category 2 LBT in which LBT is performed without a random backoff, a Category 3 LBT in which LBT is performed with a random backoff and a fixed contention window size, and a Category 4 LBT in which LBT is performed with a random backoff and a variable contention window size.

Example 25 includes the eNodeB of any of Examples 23 to 24, further comprising means for selecting the type of LBT to be utilized by the one or more UEs based on a level of radio access technology (RAT) activity during a preconfigured observation window.

Example 26 includes the eNodeB of any of Examples 23 to 25, further comprising means for: selecting a Category 1 LBT or a Category 2 LBT when the level of RAT activity during the preconfigured observation is below a defined threshold; or selecting a Category 3 LBT or a Category 4 LBT when the level of RAT activity during the preconfigured observation is above the defined threshold.

Example 27 includes the eNodeB of any of Examples 23 to 26, wherein the mode of operation includes an autonomous mode or a passive mode, wherein the autonomous mode permits the one or more UEs to select certain LBT parameters, wherein the passive mode prohibits the one or more UEs from selecting LBT parameters.

Example 28 includes the eNodeB of any of Examples 23 to 27, wherein the autonomous mode is applicable to a Category 3 LBT and a Category 4 LBT, and the passive mode is applicable to a Category 3 LBT and a Category 4 LBT.

Example 29 includes the eNodeB of any of Examples 23 to 28, wherein the set of LBT parameters include at least one of: the type of LBT, the mode of operation, a time instance or period to perform LBT, a contention window size, a minimum and maximum contention window size with respect to an LBT priority class, the LBT priority class and a backoff counter.

Example 30 includes the eNodeB of any of Examples 23 to 29, wherein the set of LBT parameters are transmitted to the one or more UEs using common signaling or UE-specific signaling Example 31 includes the eNodeB of any of Examples 23 to 30, wherein the set of LBT parameters are transmitted to the one or more UEs via an uplink (UL) scheduling grant when the type of LBT and the mode of operation are configured dynamically at the eNodeB.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology.

One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to perform uplink (UL) transmissions outside a defined base station transmission opportunity (TxOP) wherein the base station has ownership of a channel, the apparatus comprising one or more processors and memory configured to:
    process a UL opportunity received from a base station during the defined base station TxOP, wherein the UL opportunity schedules UL information to be transmitted from the UE on one or more UL subframes that are outside the defined base station TxOP;
    initiate a listen-before-talk (LBT) procedure to be performed by the UE before the UL information is transmitted from the UE on the one or more UL subframes that are outside the defined base station TxOP;
    process one or more reservation signals for transmission after the LBT procedure is performed at the UE and before the UL information is transmitted from the UE outside the defined base station TxOP;
    process the UL information for transmission to the base station on the one or more UL subframes located outside the defined base station TROP; and
    initiate a second LBT procedure to be performed before the UL information is transmitted from the UE outside the defined base station TxOP.

2. The apparatus of claim 1, further comprising a transceiver configured to:
    receive the UL opportunity from the base station; and
    transmit the UL information on the one or more UL subframes located outside the defined base station TxOP in accordance with the UL opportunity.

3. The apparatus of claim 1, wherein the UL opportunity is received from the base station via an UL grant on a downlink (DL) subframe during the defined base station TxOP or via a common physical downlink control channel (cPDCCH) on the DL subframe during the defined base station TxOP.

4. The apparatus of claim 1, wherein the UL information transmitted outside the defined base station TxOP is transmitted via one of: a physical uplink control channel (PUCCH), a physical uplink shared channel (PUSCH), an enhanced physical uplink control channel (ePUCCH), or an enhanced physical uplink shared channel (ePUSCH).

5. The apparatus of claim 1, wherein the UL opportunity is utilized by the UE that operates in an enhanced Licensed-Assisted Access (LAA) system, or in a MuLTEfire system that operates in an unlicensed spectrum without utilizing an anchor in a licensed spectrum.

6. An apparatus of a base station operable to perform scheduling for a user equipment (UE), the apparatus comprising one or more processors and memory configured to:
    initiate a listen-before-talk (LBT) procedure to be performed at a start of a defined base station transmission opportunity (TxOP);
    assign an uplink (UL) opportunity for a UE during the defined base station TxOP, wherein the UL opportunity schedules UL information to be transmitted from the UE on one or more UL subframes that are outside the defined base station TxOP;
    process the UL opportunity for transmission to the UE;
    process one or more reservation signals received from the UE after a listen-before-talk (LBT) procedure is performed at the UE and before the UL information is received from the UE outside the defined base station TxOP; and
    process the UL information received from the UE on the one or more UL subframes located outside the defined base station TxOP in accordance with the UL opportunity.

7. The apparatus of claim 6, further comprising a transceiver configured to:
    transmit the UL opportunity to the UE; and
    receive, from the UE, the UL information on the one or more UL subframes located outside the defined base station TxOP based on the UL opportunity.

8. The apparatus of claim 6, wherein the UL opportunity is transmitted from the base station via an UL grant on a downlink (DL) subframe during the defined base station TxOP or via a common physical downlink control channel (cPDCCH) on the DL subframe during the defined base station TxOP.

9. The apparatus of claim 6, wherein the UL information received from the UE outside the defined base station TxOP is received via one of: a physical uplink control channel (PUCCH), a physical uplink shared channel (PUSCH), an enhanced physical uplink control channel (ePUCCH), or an enhanced physical uplink shared channel (ePUSCH).

10. The apparatus of claim 6, wherein:
    the UL opportunity is transmitted using a component carrier that is utilized to receive the UL information; or
    the UL opportunity is transmitted using a component carrier that is different than a component carrier utilized to receive the UL information.

* * * * *